Figure 5:

June 1, 1965      F. B. MERCER      3,186,893
LAMINATED MATERIALS INCLUDING PLASTIC NETTING
Filed June 8, 1961      2 Sheets-Sheet 1
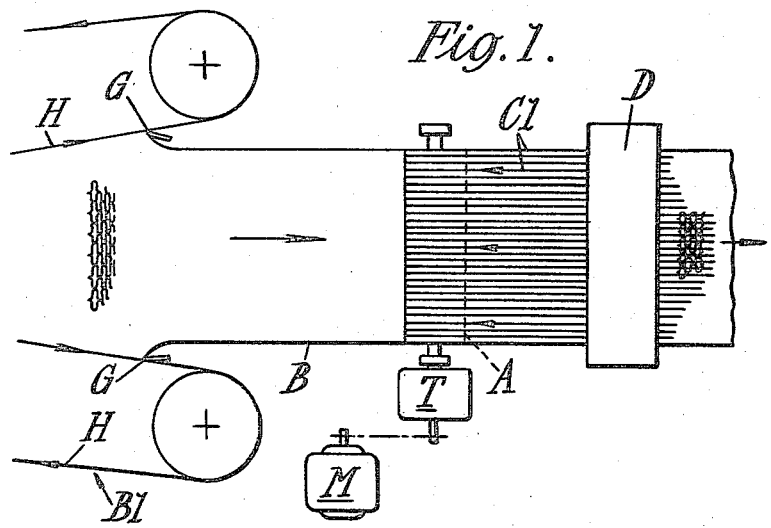
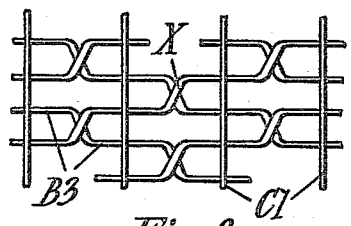
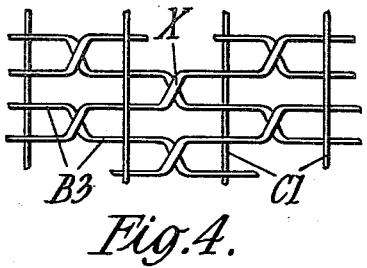
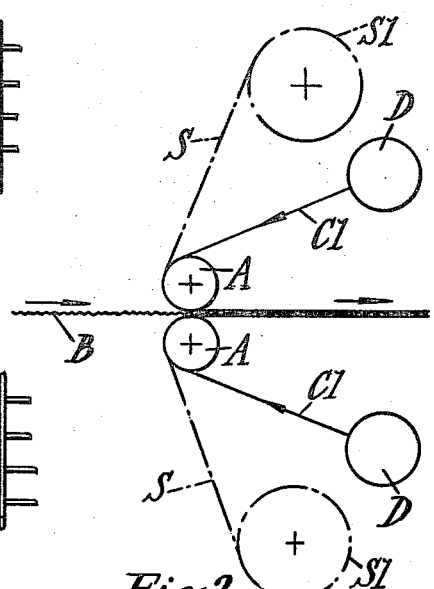
INVENTOR
FRANK BRIAN MERCER
BY
ATTORNEY June 1, 1965  F. B. MERCER  3,186,893
LAMINATED MATERIALS INCLUDING PLASTIC NETTING
Filed June 8, 1961  2 Sheets-Sheet 2

INVENTOR
FRANK BRIAN MERCER

BY *P. Ralph Snyder*

ATTORNEY

United States Patent Office 3,186,893
Patented June 1, 1965

3,186,893
LAMINATED MATERIALS INCLUDING PLASTIC NETTING
Frank Brian Mercer, Blackburn, England, assignor to Plastic Textile Accessories Limited, Blackburn, England
Filed June 8, 1961, Ser. No. 115,689
11 Claims. (Cl. 161—60)

This invention relates to a novel dimensionally stabilized laminated or composite fabric embodying plastic netting produced by extrusion methods, e.g. described in British Patent No. 836,555 and to methods and means for producing such a fabric.

The invention has for its object a novel structure comprising a dimensionally stabilized laminated or composite fabric of the said extruded plastic netting and spaced continuous linearly extending tape or filament means, the netting itself affording dimensional stability in one direction and the tape, yarn or filament means affording dimensional stability in a direction at right angles.

The invention includes the rendering of such plastic netting fabrics solid (i.e. continuous) or impervious to liquids or gases by combination of sheet material, including plastic film therewith.

The invention also includes the manufacture of such novel net fabrics which simulate a woven fabric, having a plastic weftlike structure and warp elements, the weftlike structure being composed of the molecular orientated strands of a plastic net, the orientation being effected by the transverse stretching and fixing of the net strands to a more or less parallel relation thereof substantially at rightangles to the length of the net, and the warp elements being provided by longitudinal plastic tapes, yarn or filaments alone or interspersed with non-plastic threads or longitudinal elements.

A feature of the above product lies in the fact that a weft and warp structure having dimensional stability is produced directly, without any loom weaving operation.

The term "plastic" (a) as applied to netting, includes any of the plastics specified in our Patent No. 836,555; (b) as applied to molecular oriented plastic netting, includes polythene, polypropylene, nylon and the like orientatable plastics while (c) as applied to plastic sheeting, webs, tapes, yarns, filaments or monofilaments, includes polythene, polypropylene, polyvinyl chloride and like thermoplastics.

In the accompanying drawings:

FIGURE 1 is a diagrammatic plan view of one form of apparatus for the production of the novel weft and warp fabric according to the present invention, FIGURE 2 is a side elevation of part of FIGURE 1, FIGURES 3 and 4 show on an enlarged scale details of two forms of the novel weft and warp fabric according to the present invention, FIGURES 5, 7, 9, 11 and 13 are diagrammatic cross sections, viewed in a warpwise direction, of various lamination combinations of the novel fabric, and FIGURES 6, 8, 10, 12 and 14 are each diagrammatic side elevations, corresponding to FIGURE 2, of part of the apparatus for producing the novel fabrics shown respectively in FIGURES 5, 7, 9, 11 and 13.

In carrying the invention into effect according to one mode by way of example, for producing a dimensionally stabilized laminated structure in the form of the novel weft and warp fabric product referred to above, extruded plastic netting is subjected to lateral or transverse stretching to secure transverse molecular orientation of the mesh strands of the netting. Extruded plastic netting produced, for example, as described in the above mentioned British Patent No. 836,555, is transversely stretched in a stenter-like machine, having divergent tensioning conveyors H to which the net margins are secured by a plurality of closely spaced clips. The netting B (see FIGURE 1) immediately prior to its release at G from the transverse stretching machine $B^1$ from the clips of the tensioning conveyors H, is in a form in which the mesh strands $B^3$ of the net have been stretched and molecularly orientated (see FIGURES 3 and 4) and lie in a substantially parallel relationship with each other, the net intersections X being substantially unstretched and their axes extending in directions substantially at right angles to the strands $B^3$. In this same form the net is passed to the nip between the roller A—A (as in FIGURES 1 and 2) concurrently with the application of spaced yarns or filaments $C^1$ from supply or extrusion devices D—D which are caused to adhere to the net strands. The rollers A—A are driven from a motor M through a gear box G which permits the peripheral speed of the roller A—A to be matched with the rate of release of the net B from the tensioning conveyors H so that the disposition of the net strands and intersections is not disturbed. The mesh strands $B^3$ of the net are thus disposed in the manner of loom-woven fabric and by the adhesion thereto of the yarns or filaments $C^1$ laid as warps with respect to the weft-like meshes $B^3$ of the net, as shown in FIGURES 3 and 4, wherein FIGURE 3 shows spaced yarns or filaments $C^1$ which have been all applied to one side of the net and FIGURE 4 shows spaced yarns or filaments $C^1$ applied alternately to opposite sides of the net. Various arrangements of net and yarn or filament lamination are described with reference to FIGURES 5 to 14.

In addition to the applied yarns or filaments $C^1$, the composite fabric so produced may be faced on one or both surfaces with continuous sheet material S as shown in chain-dotted lines in FIGURE 2, the sheet material S being supplied from rolls thereof $S^1$ and caused to adhere to the composite fabric as it passes therewith through the nip of the rollers A—A.

While it will be appreciated that various combination of lamination of the transversely stretched net B and yarn or filament (or tape) warp-like members $C^1$ may be arranged according to the present invention, FIGURES 5 to 14 show a few examples of such combinations. These figures show only combinations of net and yarn or filament warp-like members, but they may be supplemented by the application of sheet material to one or both faces thereof, as shown and described with reference to FIGURE 2.

Figure 6:
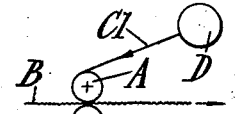
Figure 7:
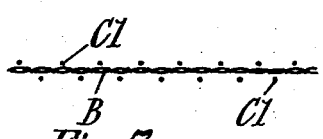
Figure 8:
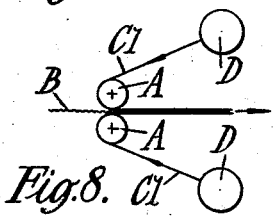
Figure 9:
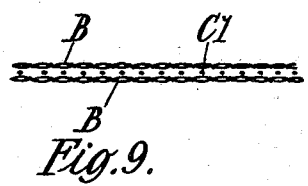
Figure 10:
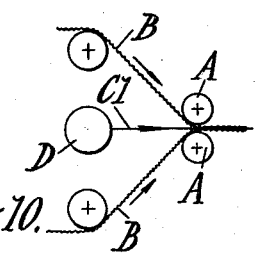
Figure 11:
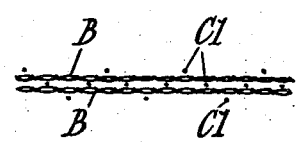
Figure 12:
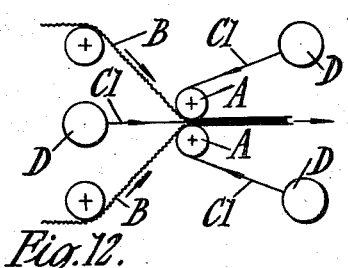
Figure 13:
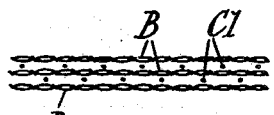
Figure 14:
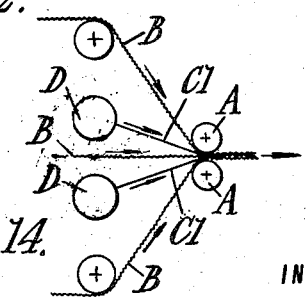

Thus, FIGURES 5 and 6 show a net B with warp-like members $C^1$ applied at equal spacing to one side thereof, the member $C^1$ being led from a source D through the nip of the rollers A—A with the net B, as already described. FIGURES 6 and 7 show a net B with warp-like members $C^1$ applied at equal alternate spacing to each side of the net B from two sources D. FIGURES 9 and 10 show warp-like members $C^1$ at equal spacing sandwiched between two layers of net B. FIGURES 11 and 12 show alternating layers of warp-like members $C^1$ and net B with the warp-like members $C^1$ as outermost layers, and FIGURES 13 and 14 show the same but the outermost layers comprising net B.

The warp-like members $C^1$ may be in the form of yarn, filament or tape which is preformed and fed from, for example, reels or alternatively filament or tape warp-like members $C^1$ may be extruded immediately prior to application to the net B. In this latter case it is preferred that such extrusion is in a downwards direction and therefore the apparatus shown as in FIGURE 2 and FIGURES 6, 8, 10, 12 and 14 would be correspondingly arranged, for example the apparatus as shown in FIGURE 2 would be rotated anti-clockwise through 90°.

While the warp-like members $C^1$ comprise freshly extruded filaments or tapes, they may be in a molten or melted (i.e. unset) condition such that when the members $C^1$ enter the nip of the rollers A—A with the net B, the pressure of the ring causes the unset members to adhere and become bonded to the net meshes as by welding. The same applies in the case of the provision of additional facing sheets S when the latter comprise freshly extruded plastic sheet material, the pressure of the nip causing each sheet S to bond to the net B (and warp-like members $C^1$) and when sheets are provided on both sides of the laminate the sheets S also bond together through the meshes of the net.

Alternatively yarns or pre-extruded and reeled filaments or tapes, or filaments or tapes of any convenient material and manufacture, can be bonded to the net by means of suitable adhesive applied, preferably, to the yarn, filaments or tapes. Likewise the facing sheets S, where such may be incorporated, may be bonded by an applied adhesive.

Thus the adhesive-bonding of the facing sheets S of sheet or web material (to and/or through the interstices of the net layer or layers) or of the warp-like members $C^1$ to the net B may be obtained by the use of any suitable adhesive or combination of adhesives, such as hot or cold adhesives, alone or in combination with molten or melted filaments or tapes, or molten or melted sheet material (as already described above). The adhesive may be applied separately during the laminating process or may be applied in the form of a pre-coating of the warp-like members $C^1$ or on one or both of the facing sheets S. Thus, for example, facing sheets S of paper may be pre-coated with a plastic material, such as polyethylene, which melts on heating (with the use of heated rollers A—A) to cause the necessary bonding through the net layer or layers.

Examples of suitable adhesives among many are: latex, bitumen, polyethylene (e.g. as a ply-precoating as mentioned above), polyvinylchloride paste, viscose solution (for bonding between two facing sheets of viscose fibre, webs), and many others.

I claim:

1. A dimensionally stabilized composite fabric embodying extruded plastic net comprising at least one layer of extruded plastic net consisting of integrally extruded net intersections and net strands the strands of which have been molecularly orientated by stretching and are disposed in substantially parallel relationship with one another and at right angles to the general axes of the net intersections and a plurality of spaced members in the form of yarn, filaments or tapes extending warp-wise of the net strands and bonded to the net strands at their intersections therewith and intermediate the net strand intersections, the net strands providing the weft structure of the fabric.

2. A fabric as claimed in claim 1, wherein the warp-wise members are located on, and bonded, to one side of a single layer of net.

3. A fabric as claimed in claim 1, wherein the warp-wise members are located on, and bonded to, both sides of a single layer of net.

4. A fabric as claimed in claim 1, wherein a plurality of layers of warp-wise members and net layers alternate.

5. A fabric as claimed in claim 1 wherein facing sheet means are bonded to at least one side of the fabric comprising the warp-wise members and weft-forming net.

6. A fabric as claimed in claim 5, wherein the facing sheet means are welded to the warp-like members and to the net.

7. A fabric as claimed in claim 5, wherein the facing sheet means are adhesively bonded to the warp-like members and to the net through the medium of applied adhesive.

8. A fabric as claimed in claim 5, wherein facing sheets are applied to both faces of the fabric comprising the warp-like member and the weft-forming net and are bonded to said members and the net and also to each other through the meshes of the net.

9. Process for the production of dimensionally stabilized composite fabric embodying extruded plastic net consisting of integrally net intersections and net strands, comprising transversely stretching at least one continuous web of extruded plastic net such that the net strands thereof are molecularly orientated and lie in substantially parallel relationship at right angles to the extent of the web in a weft-wise manner, and applying to the net strands and bonding thereto under pressure a plurality of spaced warp-forming members disposed transversely of the net strands without disturbing the substantially parallel relationship thereof.

10. Process as claimed in claim 9, wherein facing sheet material is applied and bonded to at least one side of the composite fabric comprising the stretched net and warp-forming members.

11. Process as claimed in claim 10 wherein the facing sheet material is applied and bonded to the composite fabric at the same time as the warp-forming members are applied and bonded to the net.

References Cited by the Examiner

UNITED STATES PATENTS 2,522,527  9/50  Manning _____ 117—17

EARL M. BERGERT, *Primary Examiner.*